United States Patent
Shen (10) Patent No.: US 9,703,431 B2
(45) Date of Patent: Jul. 11, 2017

(54) NOISE DETECTION AND MITIGATION FOR CAPACITIVE SENSING DEVICES

(71) Applicant: Synaptics Incorporated, San Jose, CA (US)

(72) Inventor: Luen-Ming Shen, Taipei (TW)

(73) Assignee: SYNAPTICS INCORPORATED, San Jose, CA (US)

(*) Notice: Subject to any disclaimer, the term of this patent is extended or adjusted under 35 U.S.C. 154(b) by 275 days.

(21) Appl. No.: 14/319,434

(22) Filed: Jun. 30, 2014

(65) Prior Publication Data
US 2015/0346859 A1 Dec. 3, 2015

Related U.S. Application Data (60) Provisional application No. 62/007,277, filed on Jun. 3, 2014.

(51) Int. Cl.
| | |
|---|---|
| *G09G 1/00* | (2006.01) |
| *G06F 3/044* | (2006.01) |
| *G06F 3/041* | (2006.01) |
| *G01V 3/10* | (2006.01) |

(52) U.S. Cl.
CPC ............... *G06F 3/044* (2013.01); *G01V 3/10* (2013.01); *G06F 3/0418* (2013.01)

(58) Field of Classification Search
CPC . G06F 3/044; G06F 3/041; G06F 1/00; G06F 3/0416; G06F 3/0412; G06F 3/0414
See application file for complete search history.

(56) References Cited

U.S. PATENT DOCUMENTS

| | | |
|---|---|---|
| 7,986,313 B2 | 7/2011 | Krah |
| 8,519,975 B2 | 8/2013 | Huang et al. |
| 2010/0292945 A1 | 11/2010 | Reynolds et al. |
| 2011/0007021 A1 | 1/2011 | Bernstein et al. |
| 2011/0025629 A1 | 2/2011 | Grivna et al. |
| 2012/0044199 A1 | 2/2012 | Karpin et al. |
| 2012/0050211 A1 | 3/2012 | King et al. |
| 2012/0154324 A1 | 6/2012 | Wright et al. |

(Continued)

FOREIGN PATENT DOCUMENTS

| | | |
|---|---|---|
| WO | WO-2013013629 A1 | 1/2013 |
| WO | WO-2013013633 A1 | 1/2013 |

(Continued)

*Primary Examiner* — Michael Faragalla
(74) *Attorney, Agent, or Firm* — Patterson + Sheridan, LLP (57) ABSTRACT

Techniques, including a method, for detecting an input object. The method includes driving sensing signals onto and receiving resulting signals with a first plurality of sensor electrodes and a second plurality of sensor electrodes to determine first changes of capacitance between the first plurality of sensor electrodes and an input object and the second plurality of sensor electrodes and the input object. The method also includes driving the first plurality of sensor electrodes with transmitter signals and receiving resulting signals with the second plurality of sensor electrodes to determine second changes of capacitance between the first plurality of sensor electrodes and the second plurality of sensor electrodes. The method further includes entering a high noise mode based on a comparison between the first changes of capacitance and the second changes of capacitance.

20 Claims, 5 Drawing Sheets

(56) References Cited

U.S. PATENT DOCUMENTS

| | | | |
|---|---|---|---|
| 2012/0299874 A1* | 11/2012 | Chang | G06F 3/0418 |
| | | | 345/174 |
| 2013/0100071 A1* | 4/2013 | Wright | G06F 3/044 |
| | | | 345/174 |
| 2015/0062056 A1* | 3/2015 | Sood | G06F 3/044 |
| | | | 345/174 |

FOREIGN PATENT DOCUMENTS

| | | |
|---|---|---|
| WO | WO-2013013634 A1 | 1/2013 |
| WO | WO-2013013637 A1 | 1/2013 |

* cited by examiner

NOISE DETECTION AND MITIGATION FOR CAPACITIVE SENSING DEVICES

CROSS-REFERENCE TO RELATED APPLICATIONS

This application claims the priority benefit of U.S. provisional patent application Ser. No. 62/007,277, filed Jun. 3, 2014 and titled, "Interference Detection via Absolute Capacitive Sensing." The subject matter of this related application is hereby incorporated herein by reference.

BACKGROUND

Technical Field

Embodiments of the present invention generally relate to a method and apparatus for capacitive sensing, and more specifically, to noise detection and mitigation for capacitive sensing devices.

Description of the Related Art

Input devices including proximity sensor devices (also commonly called touchpads or touch sensor devices) are widely used in a variety of electronic systems. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Environmental noise may affect the signals received while operating a proximity sensor device for capacitive sensing. More specifically, various noise signals, such as ambient signals or signals generated by various elements of the proximity sensor device may affect signals received during capacitive sensing. These noise signals may cause the proximity sensor device to incorrectly identify the presence of one or more input objects.

As the foregoing illustrates, what is needed in the art are techniques and apparatus for reducing the impact of environmental noise on proximity sensor devices.

SUMMARY

One implementation of the present disclosure includes a method for detecting an input object. The method includes driving sensing signals onto and receiving resulting signals with a first plurality of sensor electrodes and a second plurality of sensor electrodes to determine first changes of capacitance between the first plurality of sensor electrodes and an input object and the second plurality of sensor electrodes and the input object. The method also includes driving the first plurality of sensor electrodes with transmitter signals and receiving resulting signals with the second plurality of sensor electrodes to determine second changes of capacitance between the first plurality of sensor electrodes and the second plurality of sensor electrodes. The method further includes entering a high noise mode based on a comparison between the first changes of capacitance and the second changes of capacitance.

Another implementation of the present disclosure includes a processing system. The processing system includes a sensor module and a noise reduction module. The sensor module is configured to drive sensing signals onto and receive resulting signals with a first plurality of sensor electrodes and a second plurality of sensor electrodes to determine first changes of capacitance between the first plurality of sensor electrodes and an input object and the second plurality of sensor electrodes and the input object. The sensor module is also configured to drive the first plurality of sensor electrodes with transmitter signals and receive resulting signals with the second plurality of sensor electrodes to determine second changes of capacitance between the first plurality of sensor electrodes and the second plurality of sensor electrodes. The noise reduction module is configured to enter a high noise mode based on a comparison between the first changes of capacitance and the second changes of capacitance.

Another implementation of the present disclosure includes an input device. The input device includes a first plurality of sensor electrodes, a second plurality of sensor electrodes, and a processing system. The processing system includes a sensor module and a noise reduction module. The sensor module is configured to drive sensing signals onto and receive resulting signals with a first plurality of sensor electrodes and a second plurality of sensor electrodes to determine first changes of capacitance between the first plurality of sensor electrodes and an input object and the second plurality of sensor electrodes and the input object. The sensor module is also configured to drive the first plurality of sensor electrodes with transmitter signals and receive resulting signals with the second plurality of sensor electrodes to determine second changes of capacitance between the first plurality of sensor electrodes and the second plurality of sensor electrodes. The noise reduction module is configured to enter a high noise mode based on a comparison between the first changes of capacitance and the second changes of capacitance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various examples of the present technology provide an input device with a noise reduction module for reducing the impact of noise on input objects detected by an input sensing device. The noise reduction module is configured to operate sensor electrodes in the input device for capacitive sensing in an absolute sensing mode and in a transcapacitive sensing mode, and also to predict object locations based on previously detected input objects. The noise reduction module is further configured to compare the results generated in these sensing modes and the prediction results and to remove object location data about sensed objects that are determined to be insufficiently reliable. More specifically, sensing is done in both absolute capacitive and transcapacitive mode and the results are compared for inconsistencies. Object locations that are detected in one sensing mode but not another may be deemed unreliable and corresponding data removed. If any object location data are removed in this manner, the noise reduction module is also configured to enter a high noise mode, in which further analysis is performed on the sensing and prediction results, and in which further object location data may be removed.

Figure 1:
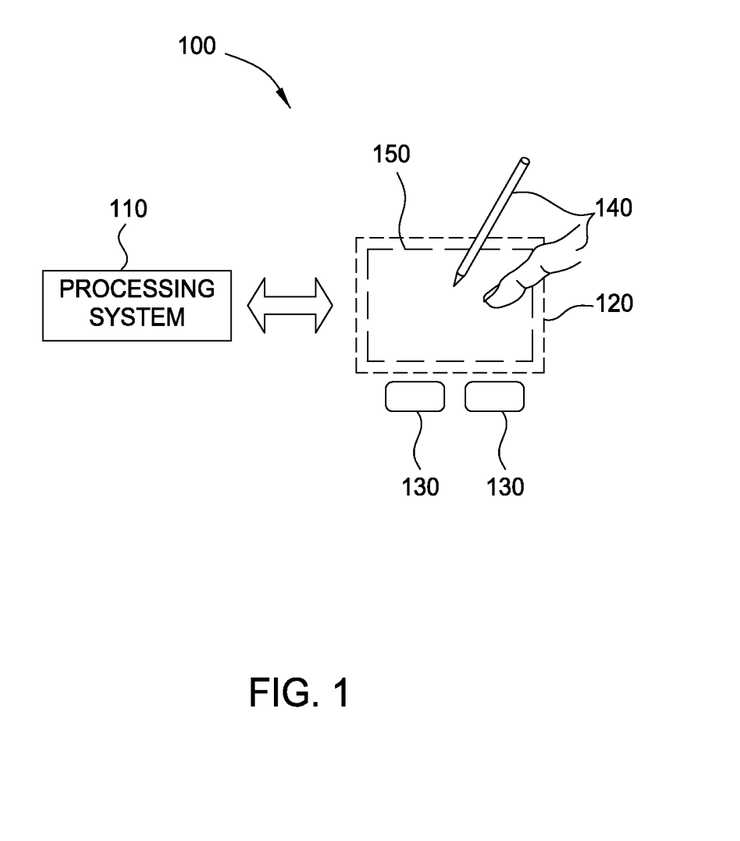
FIG. 1 is a schematic block diagram of an input device integrated into an exemplary display device, according to one example described herein.

Turning now to the figures, FIG. 1 is a block diagram of an exemplary input device 100, in accordance with embodiments of the invention. In various embodiments, the input device 100 comprises a sensing device and optionally a display device. In other embodiments, the input device 100 comprises a display device having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns 150 of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists), In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
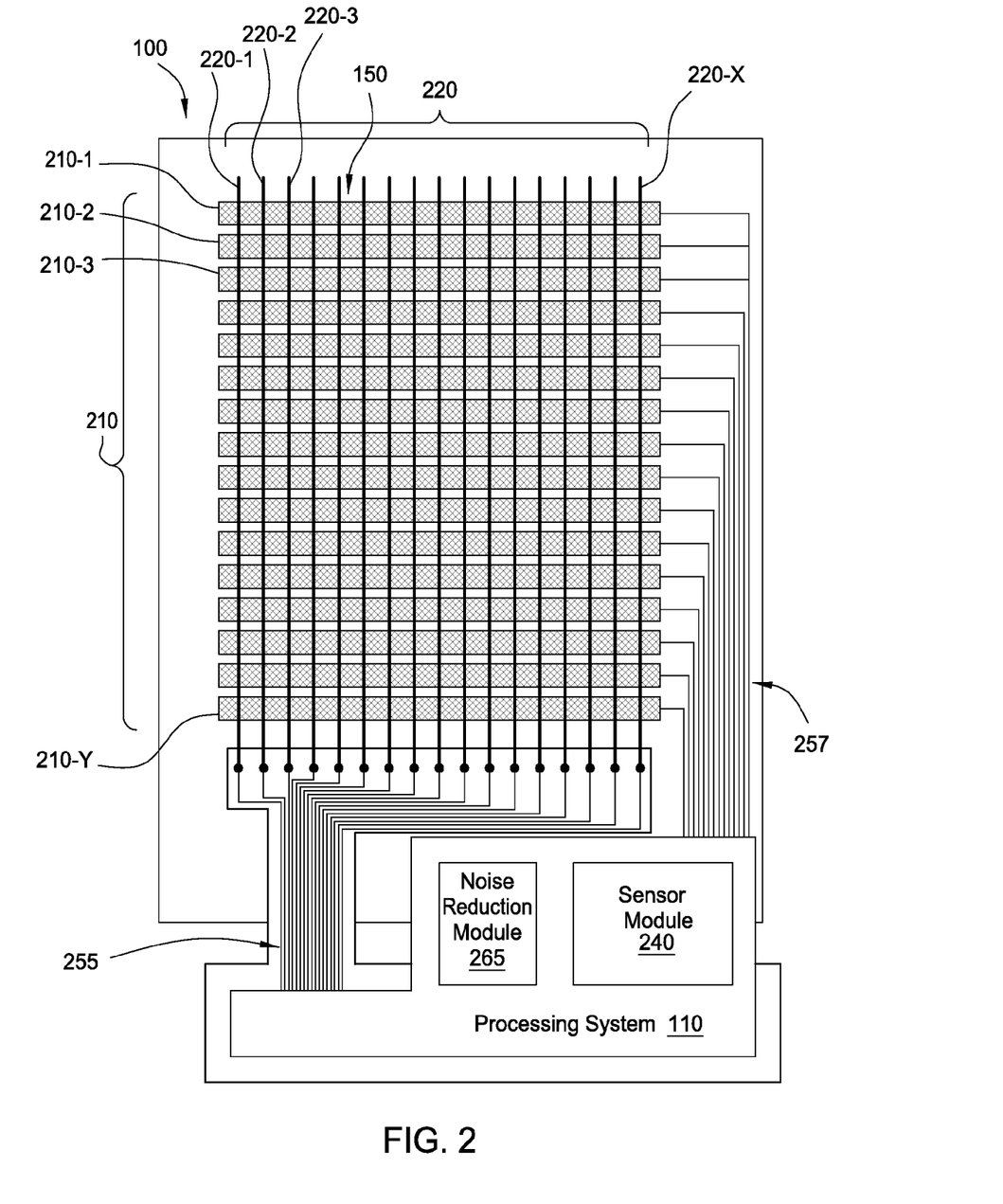
FIG. 2 illustrates a simplified exemplary array of sensor elements that may be used in the input device of FIG. 1, according to one example described herein.

FIG. 2 is a partial schematic plan view of the input device 100 of FIG. 1 in accordance with embodiments of the invention. The input device 100 includes an array of sensing elements 150 and a processing system 110. In some embodiments, the circuitry that comprises the processing system 110 is embodied as a single integrated chip (IC) or as multiple IC's. While the processing system 110 illustrated in FIG. 2 includes one IC, the processing system 110 may be implemented with more ICs to control the various components in the input device. For example, the functions of the IC of the processing system 110 may be implemented in more than one integrated circuit that can drive transmitter signals and/or receive resulting signals received from the array of sensing elements 150. In embodiments where there is more than one IC of the processing system 110, communications between separate processing system 110 ICs may be achieved through a synchronization mechanism, which sequences the signals provided to the transmitter electrodes 210. In some embodiments, the synchronization mechanism may be internal to any one of the ICs.

The array of sensing elements 150 includes a plurality of first electrodes 210 (e.g., 210-1, 210-2, 210-3, etc.) and a plurality of second electrodes 220 (e.g., 220-1, 220-2, 220-3, etc.). The first electrodes 210 and second electrodes 220 may be referred to herein collectively as "sensor electrodes." In some embodiments, the first electrodes 210 are perpendicular, or approximately perpendicular, to the second electrodes 220. Additionally, although the first electrodes 210 are illustrated in FIG. 2 as being wider than the second electrodes 220, in various embodiments, the width of the first electrodes 210 may be approximately equal to, or smaller than the width of the of the second electrodes 220.

First electrodes 210 and second electrodes 220 are ohmically isolated from each other by one or more insulators composed of electrically insulative material which separate the first electrodes 210 from the second electrodes 220 and prevent them from electrically shorting to each other. The electrically insulative material separates the first electrodes 210 and the second electrodes 220 at cross-over areas at which the electrodes intersect. In one configuration, the first electrodes 210 and/or second electrodes 220 are formed with jumpers connecting different portions of the same electrode. In other configurations, the first electrodes 210 and the second electrodes 220 are separated by one or more layers of electrically insulative material. In yet other configurations, at least some of the first electrodes 210 and second electrodes 220 may be disposed on a single layer, with no jumpers.

In some touch screen embodiments, the first electrodes 210 comprise one or more common electrodes (e.g., "V-com electrodes") used in updating the display of a display screen. In other embodiments, the second electrodes 220 comprise one or more common electrodes (e.g., "V-com electrodes") used in updating the display of the display screen. In further embodiments, the first electrodes 210 and second electrodes 220 comprise one or more common electrodes (e.g., "V-com electrodes") used in updating the display of the display screen. Further, in various embodiments the first electrodes 210 and/or second electrodes 220 comprise the entire Vcom electrode (common electrode(s)). These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), a glass substrate of an organic light emitting diode (OLED), etc. In such embodiments, the common electrode can also be referred to as a "combination electrode," since it performs multiple functions. In various embodiments, two or more first electrodes 210 or second electrodes 220 may share one or more common electrodes.

The first electrodes 210 and/or second electrodes 220 may be formed as discrete geometric forms, polygons, bars, pads, lines or other shape, which are ohmically isolated from one another. The first electrodes 210 and/or second electrodes 220 may be electrically coupled through circuitry to form electrodes having larger plan area relative to a discrete one of the first electrodes 210 and/or second electrodes 220. The first electrodes 210 and/or second electrodes 220 may be fabricated from opaque or non-opaque conductive materials. In embodiments wherein the first electrodes 210 and/or second electrodes 220 are utilized with a display device, it may be desirable to utilize non-opaque conductive materials for the first electrodes 210 and/or second electrodes 220. In embodiments wherein the first electrodes 210 and/or second electrodes 220 are not utilized with a display device, it may be desirable to utilize opaque conductive materials having lower resistivity for the first electrodes 210 and/or second electrodes 220 to improve sensor performance. Materials suitable for fabricating the first electrodes 210 and/or second electrodes 220 include Indium Tin Oxide (ITO), aluminum, silver, copper, and conductive carbon materials, among others. The first electrodes 210 and/or second electrodes 220 may be formed as contiguous body of conductive material having little or no open area (La, having a planar surface uninterrupted by holes), or may alternatively be fabricated to form a body of material having openings formed therethrough. For example, the first electrodes 210 and/or second electrodes 220 may be formed a mesh of conductive material, such as a plurality of interconnected thin metal wires.

The first electrodes 210 and second electrodes 220 may be referred to herein as "sensor electrodes." For example, first electrodes 210 may be referred to herein as "first sensor electrodes," and second electrodes 220 may be referred to herein as "second sensor electrodes." Sensor electrodes may also be used herein to refer to any combination of first electrodes 210 and/or second electrodes 220.

In one embodiment, the processing system 110 includes a sensor module 240 and a noise reduction module 265. In other embodiments, the processing system 110 also includes a determination module, a display module, and a memory. The processing system 110 is coupled to the first electrodes 210 through a first plurality of conductive routing traces 255 and to the second electrodes 220 through a second plurality of conductive routing traces 257.

The sensor module 240 drives the array of sensing elements 150 for capacitive sensing to detect the presence and position of input objects 140 within sensing region 120. The processing system 110 determines position locations based on signals received by the sensor module 240. In embodiments that include a determination module, these determinations are made by the determination module. The processing system 110 also stores location information about input objects detected in previous "capacitive frames", including signals received in the absolute sensing mode and the transcapacitive sensing mode. The term "object location data" as used herein refers to data that identifies a location at which the processing system 110 has deemed that an input object exists 140. In some embodiments, the stored information is stored in a memory. In embodiments that include a display, processing system 110 drives display elements with signals to update a displayed image. In some embodiments, a display module included in the processing system 110 drives the display elements. The noise reduction module 265 performs operations to reduce the impact of noise on signals received with the sensor electrodes.

The sensor module 240 is able to drive the array of sensing elements 150 for capacitive sensing in two different modes: an absolute sensing mode, which is based on self-capacitance (also known as absolute capacitance), and a transcapacitive mode, which is based on trans-capacitance (also known as a mutual capacitance).

In the absolute sensing mode, the sensor module 240 drives the first electrodes 210 and receives, with the first electrodes 210, first signals indicative of capacitive coupling between the first electrodes 210 and an input object 140 present in the sensing region 120, if any. The sensor module 240 also drives the second electrodes 220 and receives, with the second electrodes 220, second signals indicative of capacitive coupling between the second electrodes 220 and an input object 140 present in the sensing region 120. The processing system 110 analyzes the first signals and second signals to determine the location of the input object 140. More specifically, the processing system 110 determines one or more locations within the sensing region 120 that are associated with both first signals and second signals that have an intensity that is greater than a threshold. Each first electrode 210 is associated with a particular vertical location within the sensing region 120. Similarly, each second electrode 220 is associated with a particular horizontal location within the sensing region 120. Thus, a location within the sensing region is generally associated with one or more first electrodes 210 that have similar vertical locations as the location and one or more second electrodes 220 that have similar horizontal locations as the location. The processing system 110 determines that an input object 140 is at a particular location if both the first signal for that location and the second signal for that location are above a threshold.

In the transcapacitive mode, the sensor module 240 drives the first electrodes 210 with transmitter signals and receives resulting signals with the second electrodes 220. Alternatively, the sensor module 240 may drive the second electrodes 220 with transmitter signals and receive resulting signals with the first electrodes 210. In either case, the electrode that is transmitted with may be referred to herein as a "transmitter electrode" or "transmitter sensor electrode" and the electrode that is received with may be referred to herein as a "receiver electrode" or "receiver sensor electrode." The resulting signals received are indicative of capacitive coupling between the first electrodes 210 and the second electrodes 220. The areas of localized capacitive coupling between transmitter electrodes and receiver electrodes may be termed "capacitive pixels." The capacitive coupling between the transmitter electrodes and receiver electrodes changes with the proximity and motion of input objects in the sensing region 120 associated with the transmitter electrodes and the receiver electrodes. The sensor module 240 may be configured to pass the resulting signals to a determination module for determining the presence of an input object and/or to a memory for storage. In various embodiments, the IC of the processing system 110 may be coupled to drivers for driving the first electrodes 210 and/or second electrodes 220. The drivers may be fabricated using thin-film-transistors (TFT) and may comprise switches, combinatorial logic, multiplexers, and other selection and control logic.

Transmitter electrodes may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. The transmitter electrodes may transmit transmitter signal bursts. Transmitter signal bursts may include multiple transmitter signal cycles (e.g., 20-40 bursts). The number of bursts in a particular transmitter signal is referred to herein as a burst count. Typically, two or more transmitter signal bursts may be transmitted for each row for each capacitive frame.

The receiver electrodes may be operated singly or multiply to acquire resulting signals. The resulting signals may be used to determine measurements of the capacitive couplings at the capacitive pixels.

In the transcapacitive mode, a set of measurements from the capacitive pixels form a "capacitive image" representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. Further, the multiple capacitive images may be stored in a memory when obtained. In the absolute sensing mode, a set of measurements forms a set of profiles.

The background capacitance of the input device 100 is the capacitive image associated with no input object in the sensing region 120. The background capacitance changes with the environment and operating conditions, and may be estimated in various ways. For example, some embodiments take "baseline images" when no input object 140 is determined to be in the sensing region 120, and use those baseline images as estimates of their background capacitances. That is, some embodiments compare the measurements forming a capacitance image with appropriate "baseline values" of a "baseline image" associated with those pixels, and determine changes from that baseline image.

In some situations, the baseline image may be "relaxed." Baseline relaxation refers to a transition from one baseline capacitive image to another baseline capacitive image. More specifically, the processing system 110 updates the baseline image based on recently-received measurements, to account for any changes in the baseline image that may have occurred since previously recording a baseline image. In some embodiments, the baseline image is relaxed periodically.

Environmental noise may affect the signals received by the sensor module 240 when the sensor module 240 is driving the array of sensing elements 150 for capacitive sensing. More specifically, various noise signals, such as ambient signals or signals generated by various elements of the input device 100, may contribute to resulting signals in transcapacitive mode or to the signals received in the absolute sensing mode. These noise-corrupted signals may cause input device 100 to falsely identify a presence of one or more input objects. Falsely detected input objects are referred to herein as "ghost objects."

In order to reduce the effect of noise on the results generated by the input device 100, the processing system 110 operates the sensor electrodes in a noise detection mode. The noise reduction module 265 in the processing system 110, which may include appropriate hardware and/or software components for the operations described, may perform operations associated with the noise detection mode. More specifically, the noise reduction module 265 may perform noise reduction operations after sensor module 240 has driven the sensor electrodes for capacitive sensing. Operations described below as being performed by the processing system 110 and that are related to the noise reduction operations may alternatively be performed by the noise reduction module 265.

In the noise detection mode, the processing system 110 performs a series of steps to reduce the impact of noise as compared with a system that does not operate in a noise detection mode. The series of steps includes performing sensing in absolute sensing mode, predicting an input object 140 location based on data from previous capacitive frames, performing sensing in transcapacitive mode, determining the position of an input object 140 based on the sensing in transcapacitive mode, correlating the absolute mode results, the transcapacitive mode results, and the prediction results, rejecting object location data (i.e., data including a location that was falsely identified as including an input object 140) and entering a high noise mode based on the results of the correlation, and preparing final results data for transmission to the electronic device. The final results data is referred to as an "object locations report" herein and includes object location data for input objects 140 sensed in the sensing region 120 and may optionally exclude falsely identified locations. The object location data include locations for which an object is determined to exist. Thus, the object location data stored in the object locations report includes a set of locations at which input objects have been detected.

In the step of performing the absolute mode sensing, the sensor module 240 performs absolute sensing as described above. Thus, the sensor module 240 drives the first electrodes 210 in an absolute sensing mode and receives signals with the first electrodes 210 and drives the second electrodes 220 in an absolute sensing mode and receives signals with the second electrodes 220. The results from the absolute sensing mode comprise "absolute sensing results," which include "object location data"—data indicating locations in the sensing region 120 at which input objects 140 are determined to exist. These object location data generally comprise locations for which the signal strengths for the corresponding first electrode 210 and second electrode 220 are above a particular threshold (a "sensing threshold"). For example, if a first sensor 210 corresponding to a particular vertical coordinate has a signal strength above a particular threshold and a second sensor 220 corresponding to a particular horizontal coordinate has a signal strength above a particular threshold, then the location having the same horizontal coordinate as the first sensor 210 and the same vertical coordinate as the second sensor 220 would be included as object location data in the absolute sensing results.

In the prediction step, the processing system 110 examines information for previous capacitive frames and attempts to generate a predicted location of an input object 140 based on the stored information. In some embodiments, prediction is done by matching movements of an input object 140 detected in one or more previous capacitive frames to a set of known movements (i.e., matching a pattern of movements to the stored information). In some embodiments, one known movement is a swipe, which comprises an input object moving approximately linearly within the sensing region 120. Other known movements include tapping (e.g., repeatedly placing and removing an input object at a particular location), and drumming (e.g., a first object appearing and disappearing at a first location and then a second object appearing and disappearing at a second location, repeated in succession). When a particular pattern is recognized, the processing system 110 generates one or more predicted object location data, which include locations within the sensing region 120 at which objects are predicted to exist. The processing system 110 may generate multiple predicted locations based on the information stored. The predicted locations generated for a particular capacitive frame comprise prediction results.

In the transcapacitive sensing step, the sensor module 240 performs transcapacitive sensing as described above. More specifically, the sensor module 240 drives transmitter signals onto a transmitter electrode and receives resulting signals with a receiver electrode. The sensor module 240 performs sensing in this way for a particular location by driving a transmitter electrode and receiving with a receiver electrode where the intersection of the transmitter electrode and receiver electrode are at the location for sensing. In some embodiments, the sensor module 240 scans locations corresponding to the entire sensing region 120. In some embodiments, the sensor module 240 does not scan the entire sensing region 120 in transcapacitive mode but only scans regions within the vicinity of the locations of objects detected in the absolute sensing mode or predicted to exist in the prediction step. In other words, in some embodiments, the sensor module 240 scans sensor electrodes for which the received signal in the absolute sensing mode satisfies the sensing threshold or for which an object is predicted to exist, but does not scan sensor electrodes for which the received signal in the absolute sensing mode do not satisfy the sensing threshold or for which an object is predicted to exist. If the sensor module 240 scans less than the entire sensing region 120, then the sensor module 240 may increase the burst count for transcapacitive scans conducted relative to a "commonly used burst count," which is the burst count that is used when the sensor module 240 is in normal sensing mode (i.e., when the sensor module 240 is conducting transcapacitive sensing and has not determined that the burst count should be increased).

In the input object location calculation step, the processing system 110 determines locations within the sensing region 120 at which an input object 140 is present based on the results of the transcapacitive sensing. To do this, the processing system 110 determines which resulting signals cross a threshold. If the resulting signal for a particular location crosses a threshold, then the processing system 110 deems an input object 140 to be at that location. The result of the input object 140 calculation step is a set of transcapacitive sensing results. These results comprise the locations for which corresponding transcapacitive signals cross a particular threshold. The threshold may be constant, dynamically determined, or configurable.

In the correlation step, the processing system 110 correlates the object location data determined in the absolute sensing step and the object location data predicted in the prediction step with the object location data generated in the transcapacitance step. More specifically, the processing system 110 attempts to match each location of a detected input object in the absolute sensing results and each location of a detected input object in the prediction results with the locations of detected input objects in the transcapacitive sensing results. If a location for an object that is included in either the absolute sensing results or the prediction results is not present in the transcapacitive data, then the object location data is disregarded (i.e., not included in the object locations report). Similarly, if object location data is present in the transcapacitive sensing results that is not included in either the absolute sensing results or the prediction results, then that object location data is disregarded (i.e.; not included in the object locations report). The results from the correlation step include all object location data included in either the absolute sensing results or the prediction results and also included in the transcapacitive sensing results. These results are referred to herein as the "correlation results." These correlation results are included in the object locations report, which may later be modified by the high noise mode; as described below.

If object location data is disregarded in this way, then the processing system 110 enters a high noise mode, after which the processing system 110 prepares the object locations report and transmits that report to the electronic device. If no object location data is disregarded in this way, then the processing system 110 does not enter a high noise mode and instead proceeds directly to generate the report and transmit the report.

The report generated ("object locations report") includes data regarding the locations at which input objects are deemed to exist based on the absolute sensing step, data regarding the locations at which input objects are deemed to exist based on the prediction step, and data regarding the locations at which input objects are deemed to exist based on the transcapacitive step, as modified by both the correlation step, and, if conducted, by the high noise mode step. More specifically, if the high noise mode step is not performed, then the report generated includes all of the locations in the transcapacitive sensing results (which are the same as the results in the prediction results and the absolute sensing results, since all object location data matched in the correlation step). If the high noise mode is performed, then the report includes the locations in the transcapacitive sensing results, the absolute sensing results, and the prediction results, as modified by the correlation step, and also as modified by the high noise mode step. The high noise mode is now described in more detail.

In one or more embodiments, the high noise mode is a mode in which the processing system 110 analyzes data stored (e.g., in a memory) about sensing results from previous capacitive frames and modifies the object locations report based on the stored data from the previous frames. In the high noise mode, the processing system 110 may perform one or more operations to modify locations in the object locations report. Such operations may include one or more of the following: removing object locations data for which a corresponding object is not detected in at least a threshold number of previous capacitive frames; removing object locations data for probable duplicate input objects: removing object locations data for input objects determined to have previously "left" the sensing region 120 for a threshold number of capacitive frames; performing a smoothing operation based on the data stored; adding object locations data for input objects 140 that were previously detected for a threshold number of frames; and suspending baseline relaxation. These operations are now described in more detail.

For the operation to remove objects not detected in at least a threshold number of previous capacitive frames, for each location in the sensing region 120 for which object location data is included in the object locations report, the processing system 110 determines if an input object 140 corresponding to that location has been detected in at least a threshold number of previous capacitive frames. The threshold for the threshold number may be dynamically determined, configurable, or constant. A dynamic determination may be based on the noise levels. As the noise level increases, the processing system 110 may also increase the threshold. The processing system 110 may map different noise levels to different thresholds. Configurable thresholds may be configured during configuration of the processing system 110. A configured threshold may be based on a predicted noise level for the device, balanced against a desired maximum level of lag, as increasing the threshold also increases the level of lag. A constant threshold is a threshold that remains constant and that is based on empirical data. If no input object 140 corresponding to that location was detected in at least the threshold number of previous capacitive frames, then the processing system 110 removes the object location data corresponding to that location from the object locations report. If an input object 140 corresponding to that location was detected in at least the threshold number of previous capacitive frames, then the processing system 110 does not remove any object location data. In some embodiments, processing system 110 identifies an object as being the same object in different capacitive frames based on similarities in number and location of object locations included in the previous capacitive frames. For example, if data for a single object location is included for one capacitive frame and data for another single object location is included for an immediately prior capacitive frame and the first object location is near to the second object location, then the processing system may deem that the first object location data and second object location correspond to the same input object 140.

For the operation consisting of removing probable duplicates, the processing system 110 examines the object locations data stored to determine whether a "duplicate" object is detected in the current frame. A duplicate object is detected if signals received with a single sensor electrode cause two instances of object detection to occur. This situation can happen in absolute sensing mode if, for example, a signal for a particular first electrode 210 is above a threshold and signals for two different second electrodes 220 are both above a threshold. In such a situation, objects would be deemed to be detected at the intersection between the first electrode and the two second electrodes 220. Both object would be detected based on signals received with a single electrode (the first electrode 210).

If signals received with a single sensor electrode cause two or more instances of object detection to occur, then the processing system 110 deems one of those detected input objects to be a duplicate. If signals received with a single sensor electrode do not cause two or more instances of object detection to occur, then the processing system 110 does not deem any detected object to be a duplicate. In some embodiments, the processing system 110 simply disregards the object location deemed to be a duplicate. Again, disregarding the object locations means not including the corresponding object location data in the object locations report. In some embodiments, a first object location is deemed to be a duplicate if the first object location appears after (i.e. in a later capacitive frame) a second object location. In some embodiments, the object location that is deemed to be a duplicate is not outright disregarded, but instead the processing system 110 increases the detection threshold for the object location that is deemed to be a duplicate. In other words, the processing system 110 increases the signal threshold for the signal corresponding to the object location. If the corresponding signals for transcapacitance and absolute sensing are above this increased threshold, then the object location that is deemed to be a duplicate is reported and not disregarded. If the signal is below this increased threshold, then the object location is disregarded. In some embodiments, if the object location deemed to be a duplicate exists for a threshold number of capacitive frames, then the object location is no longer deemed to be a duplicate and is reported to the electronic device. If the object location exists for less than the threshold number of capacitive frames, then the object location is still deemed to be a duplicate.

For the operation for removing objects that had previously left the sensing region 120 for a threshold number of frames, the processing system 110 disregards object locations sensed within a threshold number of capacitive frames after another object has left that same location. Processing system 110 only disregards such object locations if the sensed object location and the object that has left are sensed with the same pair of first electrode 210 and second electrode 220. The threshold number of capacitive frames may be preset, configurable, or dynamically adjusted, as described above.

For the smoothing operation, processing system 110 applies a smoothing calculation to the data stored for previous capacitive frames in conjunction with the data measured for the current capacitive frame (which includes the signals received in response to performing absolute sensing and/or transcapacitive sensing). In various embodiments, the smoothing calculation may consist of an averaging function applied to the object location data stored for previous capacitive frames and detected for the current capacitive frame, or an averaging function applied to the object location data stored for most recent capacitive frames and detected for the current capacitive frame. Further, the smoothing calculation may consist of an averaging function applied for each object location in the current capacitive frame, and applied to that location and locations in the vicinity of that object location. In various embodiments, smoothing calculations other than averaging may be applied. For example, interpolation or curve fitting may be applied. The smoothing calculations are applied to the positional information for the object locations stored and for the current capacitive frame.

For the object adding operation, the processing system 110 adds object location data into the object locations report if an object was detected in a threshold number (which may be constant, configurable, or dynamically adjusted, as described above) of previous capacitive frames but not in the current capacitive frame. To determine that an object was detected in a threshold number of previous capacitive frames, the processing system 110 examines the stored data. If an object is detected within a certain area of the sensing region 120 (that may be less than the entire sensing region and may include, for example, the area around a specific intersection of a first electrode 210 and a second electrode 220) for a threshold number of frames, then an object corresponding to that object location is deemed to have been detected for a threshold number of previous capacitive frames. If no object is detected in this manner, then no object location data is added to the object locations report.

For the suspend baseline relaxation operation, the processing system stops periodic relaxation of the baseline image. As described above, baseline relaxation refers to adjusting the baseline image based on recently-taken capacitive measurements. When in the high noise mode, the processing system 110 may suspend periodic baseline relaxation until the high noise mode has ended.

After the processing system 110 generates the object locations report and transmits the report to the electronic device, sensing for the current capacitive frame is over, and the processing system 110 begins again at the first step (the absolute mode sensing step) for the next capacitive frame. The processing system 110 also stores the absolute sensing results, the prediction results, and the transcapacitive sensing results for use in later capacitive frames. If the processing system 110 entered the high noise mode for the current capacitive frame, then the processing system 110 leaves the high noise mode when the next capacitive frame begins.

Figure 3:
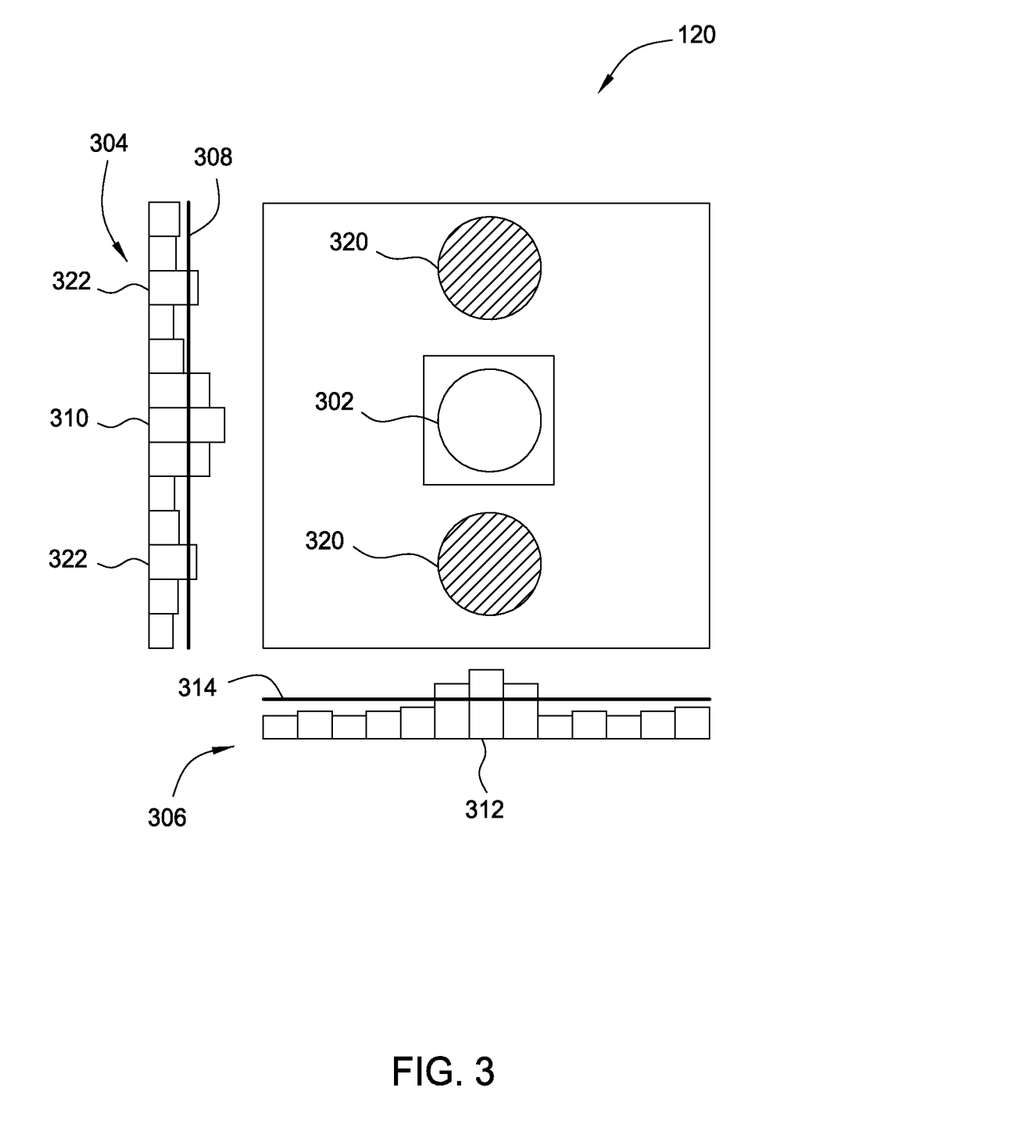
FIG. 3 illustrates "ghost objects" detected in the sensing region of FIG. 1, according to one example described herein.

FIG. 3 illustrates input object locations sensed in the sensing region 120 during the absolute sensing mode, the prediction mode, and the transcapacitive sensing mode, for a particular capacitive frame, according to an embodiment. An input object 140 is present within sensing region 120, which causes processing system 110 to detect object at location 302. A processing system 110 conducting absolute sensing would detect the object at object location 302 because vertical absolute sensing measurements 304 and horizontal absolute sensing measurements 306 indicate the presence of such an object. More specifically, the vertical absolute sensing measurements 304 include a signal strength above a vertical threshold 308 at a first vertical location 310, and the horizontal sensing measurements 306 include a signal strength above a horizontal threshold 314 at a first horizontal location 312. While processing system 110 would correctly determine the position of an input object 140 at the location 302, the processing system 110 would also detect the presence of ghost objects 320. Processing system 110 would detect ghost objects 320 because noise has caused corresponding vertical signals 322 to exceed the vertical threshold 308. Thus, two ghost objects 320 are detected, located where the vertical signals 322 that exceed the vertical threshold 308 intersect with the horizontal sensing measurement 306 that exceeds the threshold 314. With the techniques described above, the ability to correctly identify ghost objects is increased, and correspondingly, the number of ghost objects potentially included in the data report to the electronic device is reduced, thereby increasing the accuracy of the input device 100.

Figure 4:
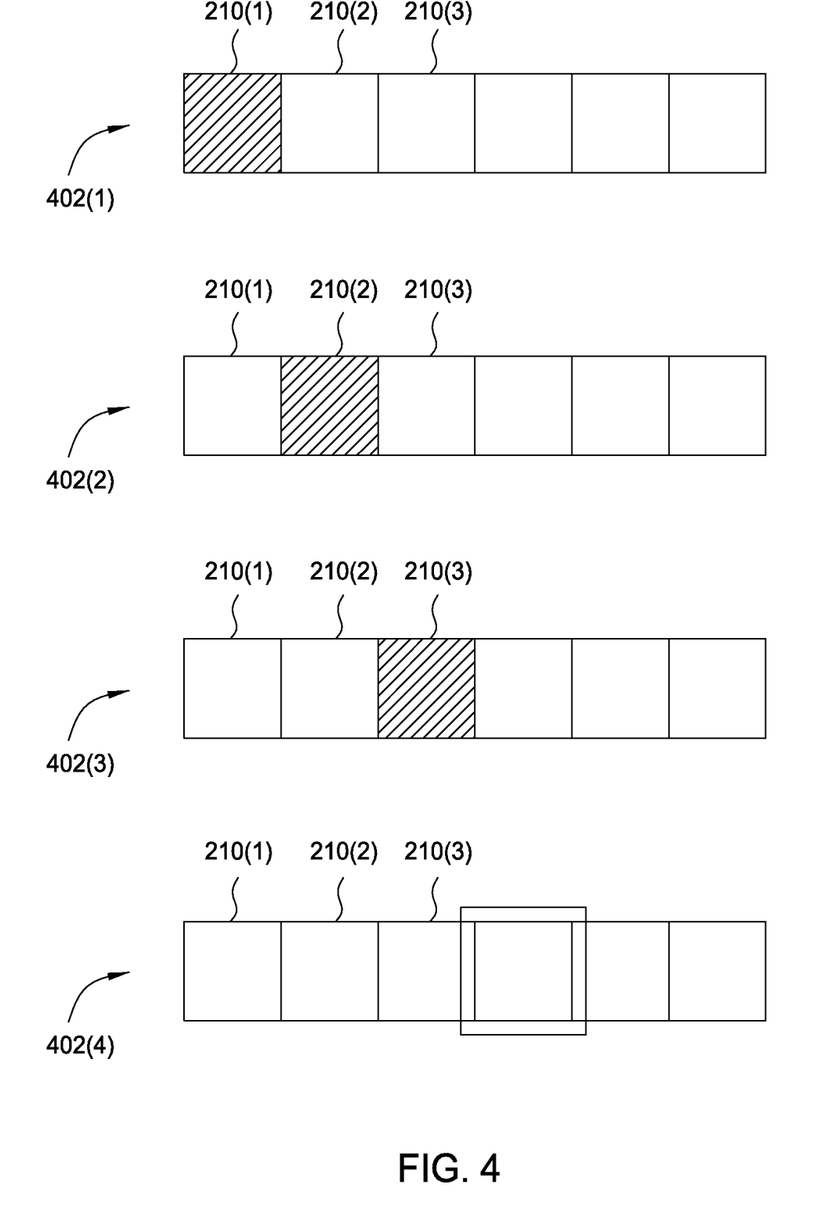
FIG. 4 illustrates a prediction operation for predicting an object location, according to one example described herein.

FIG. 4 illustrates a prediction operation, according to one embodiment. For simplicity, only first electrodes 210 are depicted. The prediction operation is shown over a series of capacitive frames 402. In the first capacitive frame 402(1), a signal at first electrode 210(1) is above a threshold and therefore, an object is deemed to exist at a particular location based on that signal. In the second capacitive frame 402(2), a signal at a second electrode 210(2) is above a threshold and an object is deemed to exist at a particular location based on that signal. In the third capacitive frame, an object is deemed to exist based on a signal associated with the third electrode 210(3). At the fourth capacitive frame 402(4), the processing system 110 predicts that an object associated with fourth electrode 210(4) exists, because of the pattern observed in the previous three capacitive frames. More specifically, the processing system 110 observed that an object moved from left to right with a velocity of one electrode 210 per frame and therefore calculates that in the fourth capacitive frame, an object associated with the fourth electrode 210(4) would exist at the location associated with the fourth electrode 210(4).

Figure 5:
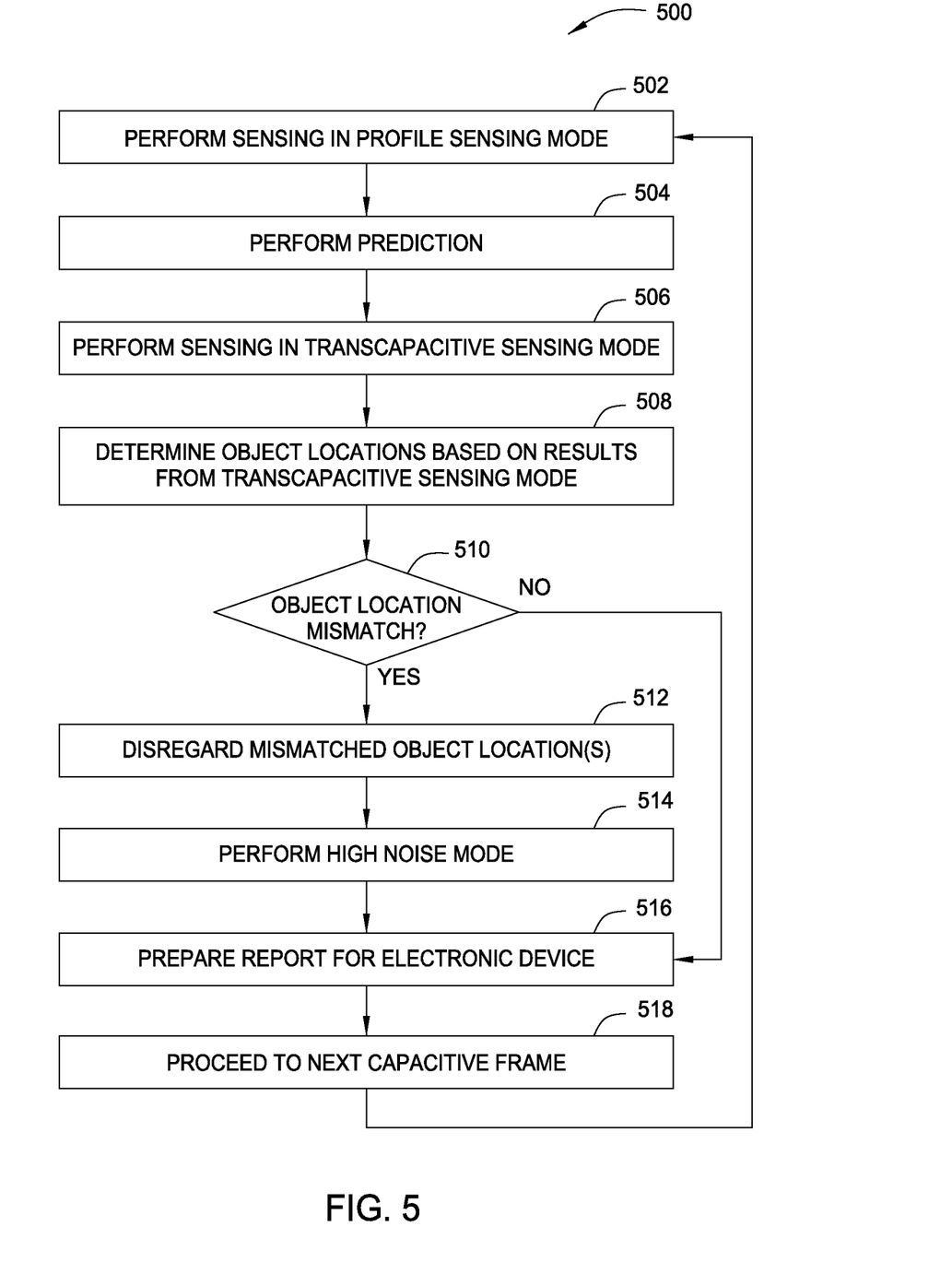
FIG. 5 is a flow diagram of method steps for operating the input device of FIG. 1 in noise detection mode, according to one example described herein.

FIG. 5 is a flow chart of a method 500 for operating sensor electrodes in a noise detection node, according to an embodiment. Although the method steps are described in conjunction with FIGS. 1-4, persons skilled in the art will understand that any system configured to perform the method steps, in various alternative orders, falls within the scope of the present invention.

The method 500 begins at step 502, where processing system 110 performs sensing in absolute sensing mode. As described above, in absolute sensing mode, the sensor module 240 drives first electrodes 210 in an absolute sensing mode and receives signals with the first electrodes 210. The sensor module 240 also drives second electrodes 220 in an absolute sensing mode and receives signals with the second electrodes 220. Input objects 140 are deemed to exist at locations corresponding to a first electrode 210 for which a signal is above a threshold and a second electrode 220 for which a signal is above a threshold. The signals received comprise absolute sensing results. The processing system 110 records these absolute sensing results for later analysis.

At step 504, the processing system 110 performs a prediction step. As described above, the processing system 110 examines stored object location data and attempts to recognize a pattern in that object location data. More specifically, the processing system 110 attempts to find a series of locations at which objects are detected that match a particular known pattern such as swiping, tapping, or drumming. If a particular pattern is recognized, then the processing system 110 deems that a particular location is predicted to have an input object 140, and records that location as a predicted object location. If no such pattern is recognized, then the processing system 110 does not deem that any location is predicted to have an input object 140.

At step 506, the processing system 110 performs sensing in transcapacitive sensing mode. More specifically, the sensor module 240 drives transmitter signals onto a transmitter electrode and receives resulting signals with a receiver electrode. In some embodiments, the sensor module 240 performs transcapacitive sensing for each transmitter electrode-receiver electrode pair to determine capacitive characteristics for locations that span the entire sensing region 120.

At step 508, the processing system 110 analyzes the resulting signals received during transcapacitive sensing to determine locations for input objects 140 in the sensing region 120, if any. If a resulting signal received for a particular transmitter electrode-receiver electrode pair satisfies a threshold, then an input object 140 is deemed to be detected at the location associated with that transmitter electrode-receiver electrode pair. If a resulting signal does not satisfy a threshold, then an input object 140 is to be not detected at the location corresponding to the resulting signal.

At step 510, the processing system 110 determines whether there are any object location mismatches. An object location mismatch occurs if an object location in either the absolute sensing results or the prediction results is not present in the transcapacitive data. An object location mismatch also occurs if an object location is present in the transcapacitive sensing results that is not included in either the absolute sensing results or the prediction results, then that object location is disregarded. If an object location mismatch occurs, then the method 500 proceeds to step 512. If an object location mismatch does not occur, then the method 500 proceeds to step 516.

At step 512, the processing system 110 disregards mismatched object locations. Disregarding object locations means not including those object locations in the detected object location data that is reported to the electronic device.

At step 514, the processing system 110 performs a high noise mode. A high noise mode is a mode in which the processing system 110 analyzes data stored (e.g., in a memory) about object locations detected in previous capacitive frames and modifies the data stored in the object locations report based on the stored data from the previous frames. In high noise mode, the processing system 110 may perform one or more operations to modify locations in the object locations report. Such operations may include the following: removing objects not detected in at least a threshold number of previous capacitive frames: removing probable duplicates; removing object location data for input objects 140 that had previously "left" the sensing region 120 for a threshold number of capacitive frames; performing a smoothing operation based on the data stored in a memory; adding objects that were previously detected for a threshold number of frames; and suspending baseline relaxation. These operations are described above in more detail.

At step 516, the processing system 110 transmits a report to the electronic device, where the transmitted report includes the object locations detected and not excluded in the disregard step (512). At step 518, the processing system 110 proceeds to the next capacitive frame and returns to step 502.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A method for detecting an input object, the method comprising:
   driving a first plurality of sensor electrodes for absolute capacitive sensing and a second plurality of sensor electrodes for absolute capacitive sensing by driving the first plurality of sensor electrodes and the second plurality of sensor electrodes with sensing signals
   to determine first changes of capacitance between the first plurality of sensor electrodes and the input object and the second plurality of sensor electrodes and the input object;
   driving the first plurality of sensor electrodes for transcapacitive sensing with transmitter signals;
   receiving resulting signals with the second plurality of sensor electrodes to determine second changes of capacitance between the first plurality of sensor electrodes and the second plurality of sensor electrodes; and
   entering a high noise mode of operation based on a comparison between the first changes of capacitance and the second changes of capacitance.

2. The method of claim 1, further comprising:
   generating a predicted location of the input object based on previous locations of the input object.

3. The method of claim 2, further comprising:
   rejecting a candidate location of the input object based on the first changes of capacitance, the predicted location, and the second changes of capacitance.

4. The method of claim 3, wherein rejecting the candidate location comprises:
   correlating a first set of object locations based on the predicted location and the first changes in capacitance with a second set of object locations based on the second changes in capacitance.

5. The method of claim 4, wherein correlating the first set of object locations with the second set of object locations comprises:
   determining that the first set of object locations does not include the same object locations as the second set of object locations.

6. The method of claim 1, wherein the high noise mode comprises:
   foregoing reporting an object location until a confidence threshold for that object location is reached.

7. The method of claim 1, wherein the high noise mode comprises:
   suspending baseline relaxation.

8. The method of claim 1 wherein driving the first plurality of sensor electrodes comprises:
   driving a subset of the first plurality of sensor electrodes, where each sensor electrode in the subset is proximate to a sensor electrode for which the first changes of capacitance indicate presence of the input object.

9. The method of claim 8, wherein driving the first plurality of sensor electrodes further comprises:
   increasing a burst count relative to a commonly used burst count for transcapacitive sensing.

10. A processing system for operating an input device for capacitive sensing, the processing system comprising:
    a sensor module configured to:
        drive a first plurality of sensor electrodes for absolute capacitive sensing and a second plurality of sensor electrodes for absolute capacitive sensing by driving the first plurality of sensor electrodes and the second plurality of sensor electrodes with sensing signals
        to determine first changes of capacitance between the first plurality of sensor electrodes and the input object and the second plurality of sensor electrodes and the input object;
        drive the first plurality of sensor electrodes for transcapacitive sensing with transmitter signals; and
        receive resulting signals with the second plurality of sensor electrodes to determine second changes of capacitance between the first plurality of sensor electrodes and the second plurality of sensor electrodes; and
    a noise reduction module configured to:
        enter a high noise mode of operation based on a comparison between the first changes of capacitance and the second changes of capacitance.

11. The processing system of claim 10, wherein the noise reduction module is further configured to:
    generate a predicted location of the input object based on previous locations of the input object.

12. The processing system of claim 11, wherein the noise reduction module is further configured to:
    reject a candidate location of the input object based on the first changes of capacitance, the predicted location, and the second changes of capacitance.

13. The processing system of claim 12, wherein the noise reduction module is configured to reject the candidate location by:
    correlating a first set of object locations based on the predicted location and the first changes in capacitance with a second set of object locations based on the second changes in capacitance.

14. The processing system of claim 13, wherein the noise reduction module is configured to correlate the first set of object locations with the second set of object locations by:
    determining that the first set of object locations does not include the same object locations as the second set of object locations.

15. The processing system of claim 10, wherein, in the high noise mode, the noise reduction module is configured to:
    forego reporting an object location until a confidence threshold for that object location is reached.

16. The processing system of claim 10, wherein, in the high noise mode, the noise reduction module is configured to:
    suspending baseline relaxation.

17. The processing system of claim 10 wherein the noise reduction module is configured to cause the sensor module to drive the first plurality of sensor electrodes with transmitter signals and receive resulting signals with the second plurality of sensor electrodes by:
    causing the sensor module to drive a subset of the first plurality of sensor electrodes, where each sensor electrode in the subset is proximate to a sensor electrode for which the first changes of capacitance indicate presence of the input object.

18. The processing system of claim 17, wherein the noise reduction module is configured to cause the sensor module to drive sensing signals onto and receive resulting signals with the first plurality of sensor electrodes and the second plurality of sensor electrodes by:
  causing the sensor module to increase a burst count relative to a commonly used burst count for transcapacitive sensing.

19. An input device, comprising:
a first plurality of sensor electrodes;
a second plurality of sensor electrodes; and
a processing system, comprising:
  a sensor module configured to:
    drive a first plurality of sensor electrodes for absolute capacitive sensing and a second plurality of sensor electrodes for absolute capacitive sensing by driving the first plurality of sensor electrodes and the second plurality of sensor electrodes with sensing signals
    to determine first changes of capacitance between the first plurality of sensor electrodes and the input object and the second plurality of sensor electrodes and the input object;
    drive the first plurality of sensor electrodes for transcapacitive sensing with transmitter signals; and
    receive resulting signals with the second plurality of sensor electrodes to determine second changes of capacitance between the first plurality of sensor electrodes and the second plurality of sensor electrodes; and
  a noise reduction module configured to:
    enter a high noise mode of operation based on a comparison between the first changes of capacitance and the second changes of capacitance.

20. The input device of claim 19, wherein the noise reduction module is further configured to:
reject a candidate location of the input object based on the first changes of capacitance, a predicted location, and the second changes of capacitance.

* * * * *